Figure 1:
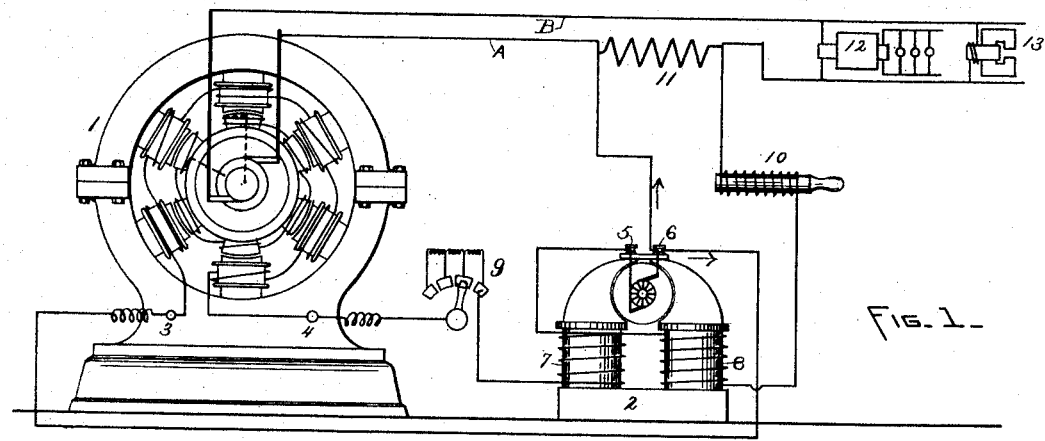

(No Model.) 4 Sheets—Sheet 1.

H. LEMP.
METHOD OF AND APPARATUS FOR REGULATING ALTERNATING CURRENT DYNAMOS.

No. 504,497. Patented Sept. 5, 1893.

WITNESSES
T. F. Courey
Wm. H. Capel.

INVENTOR
Hermann Lemp
By H. L. Townsend
Atty.

(No Model.) 4 Sheets—Sheet 2.

H. LEMP.
METHOD OF AND APPARATUS FOR REGULATING ALTERNATING CURRENT DYNAMOS.

No. 504,497. Patented Sept. 5, 1893.

WITNESSES
T. F. Courey.
Wm. H. Capel.

INVENTOR
Hermann Lemp
By H. C. Townsend
Atty.

(No Model.) 4 Sheets—Sheet 3.
H. LEMP.
METHOD OF AND APPARATUS FOR REGULATING ALTERNATING CURRENT DYNAMOS.
No. 504,497. Patented Sept. 5, 1893.
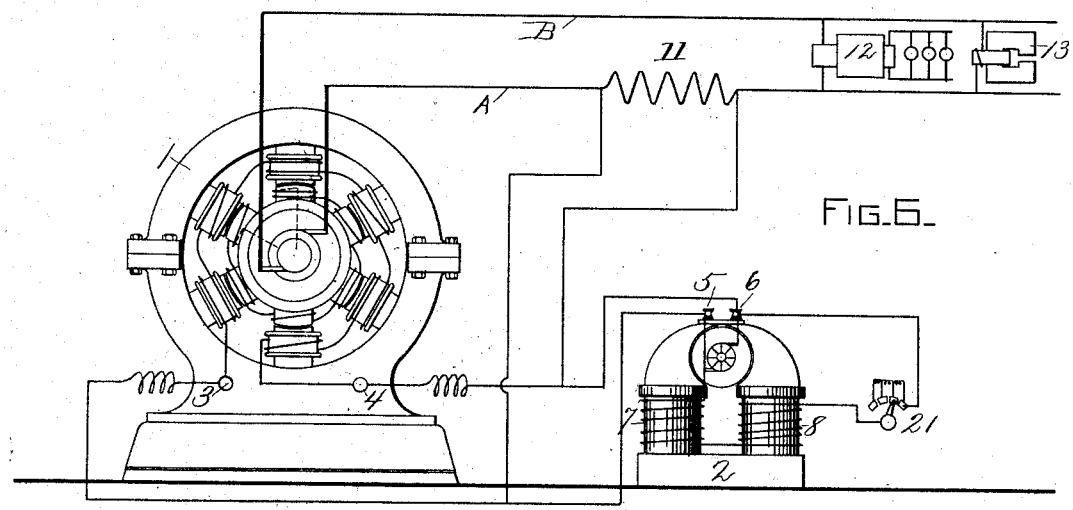
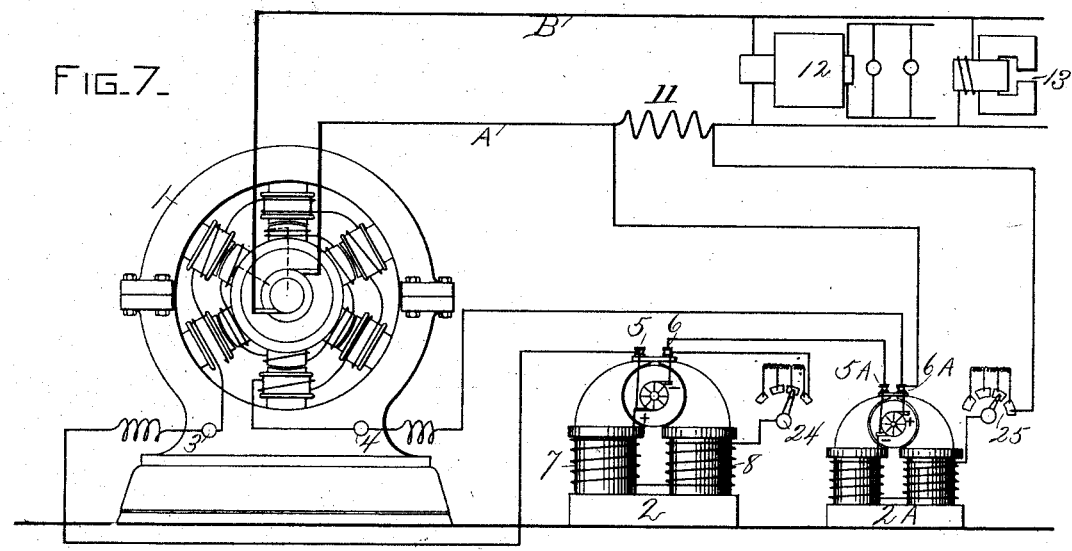
WITNESSES
T. F. Courey
Wm H. Capel
INVENTOR
Hermann Lemp
By H. C. Townsend
Atty.

(No Model.) 4 Sheets—Sheet 4.
H. LEMP.
METHOD OF AND APPARATUS FOR REGULATING ALTERNATING CURRENT DYNAMOS.
No. 504,497. Patented Sept. 5, 1893.
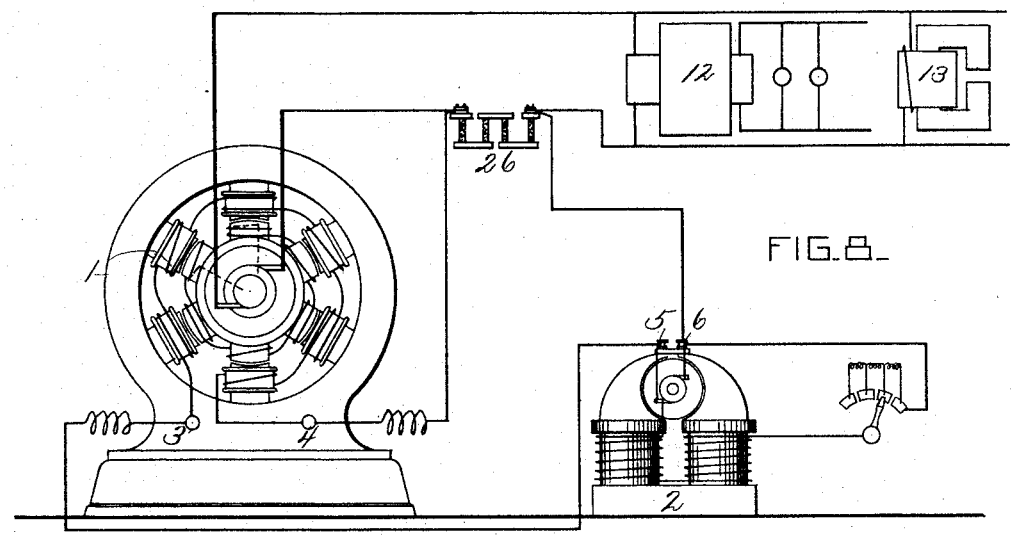
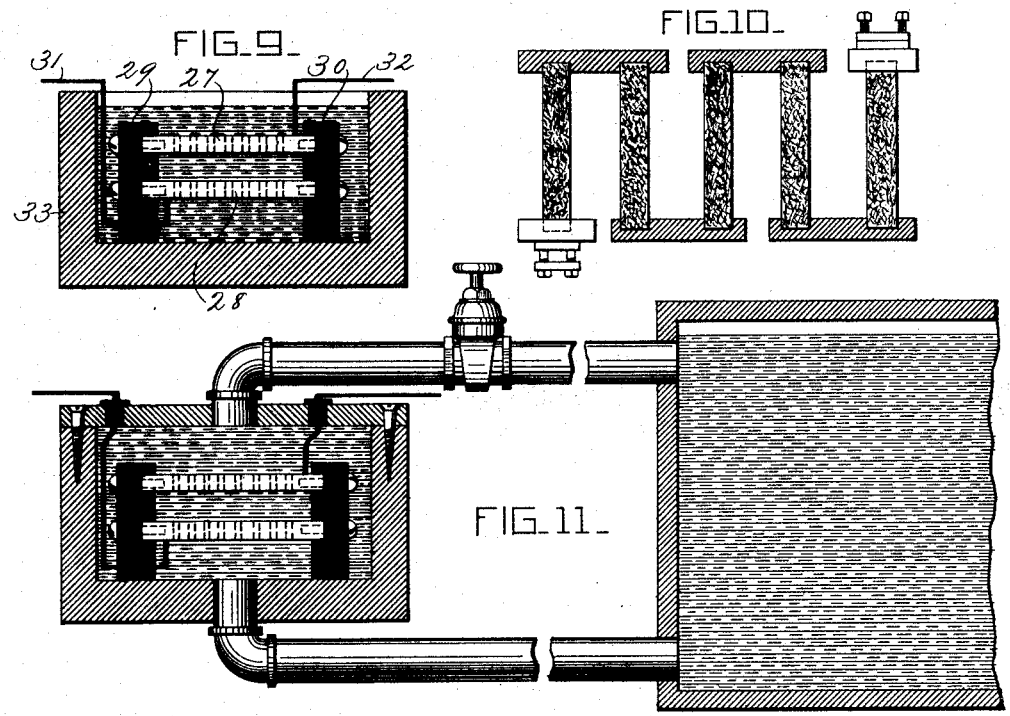
WITNESSES.
INVENTOR.
Hermann Lemp

UNITED STATES PATENT OFFICE.

HERMANN LEMP, OF LYNN, MASSACHUSETTS, ASSIGNOR TO THE THOMSON ELECTRIC WELDING COMPANY, OF MAINE.

METHOD OF AND APPARATUS FOR REGULATING ALTERNATING-CURRENT DYNAMOS.

SPECIFICATION forming part of Letters Patent No. 504,497, dated September 5, 1893.

Application filed January 19, 1891. Serial No. 378,225. (No model.)

*To all whom it may concern:*

Be it known that I, HERMANN LEMP, a citizen of the United States, and a resident of Lynn, in the county of Essex and State of Massachusetts, have invented certain new and useful Compounding Alternating-Current Dynamos, of which the following is a specification.

My invention consists of a new method of and apparatus for regulating or controlling the output of an alternating current dynamo to suit changes in the electrical load. Heretofore in regulating such dynamos the common practice has been to take alternating current from the main of said machine either as a shunt to the work or in series with the work and by a suitable commutator, operated in harmony with the alternations, to turn the alternating current into a continuous current for varying the excitation of the field of the dynamo either directly or by changing the field of a separate exciter. Such a commutator is obviously necessary whether such alternating current be used directly or be converted through a transformer into alternations on a local or separate circuit, the commutator in the latter case being placed in the secondary circuit of the transformer.

My present invention avoids the use of such commutator, and consists essentially in producing the required variations in the excitation of the dynamo by variations in a controlling or regulating resistance, the resisting conductor of which is heated directly or indirectly by the alternating current of the machine, and thereby varies automatically in its effects with variations of such currents. The variations of resistance thus produced may be made to vary the excitation of the dynamo by varying the flow of current in the field coils directly but, preferably, are used to vary the excitation of the field of a separate exciting machine in any of the ways well known to electricians for varying the flow of current in a circuit by variations of resistance. The alternating current of the dynamo may be made to heat the resistance directly or indirectly either by conduction of the heat produced by the alternating current in a resisting portion of its circuit or by conversion into energy on another circuit, as by a transformer. Such transformation may be produced one or more times so that the variable controlling resistance will be effected by a tertiary alternating current or one even farther removed from the primary. These are modifications capable of many variations or extensions all embodying the use of the alternating current of the machine to heat directly or indirectly a resistance variable under changes of temperature and employed to control the excitation of the machine in any way either directly or by controlling the field or excitation of a separate exciter or otherwise.

My invention consists further in certain devices and combinations of apparatus hereinafter described and specified in the claims.

In carrying out my invention I prefer to employ the main current or that which flows through the work to heat the controlling or regulating resistance, though it would be within my invention to use a shunted portion of the main current or the current in a shunt or derived circuit to the work. The conductor constituting the regulating resistance may be one whose resistance shall increase with increased temperature or shall decrease.

In the accompanying drawings:—Figures 1, 2, 3 and 4, are diagrams illustrating several ways of carrying out my invention. Fig. 5, shows a modification in the way of heating the controlling resistance. Figs. 6, 7 and 8, illustrate diagrammatically other modifications of my invention. Figs. 9, 10 and 11, illustrate a construction of controlling or variable resistance.

In Fig. 1,— 1, is an alternating current generator, and 2, is an exciting dynamo of the direct current type. 3 and 4, represent the terminals of the field winding of the former, and 5 and 6, the terminals connected to the commutator brushes for the armature of a separate exciter dynamo. A and B, are the main lines from the alternating current generator that furnishes current supplying a lighting transformer 12, electric welding machine 13, or any other apparatus. 11, is a conductor forming the variable or controlling resistance heated by the alternating currents from the dynamo 1, and serving to control or vary the excitation of the dynamo 2. In the plan shown the resistance is in the main circuit with the work. The exciter dynamo supplies current to the terminals of the field of 1, through a field coil 7, of its own field magnet, and the resistance 11, is in a separate circuit including a field coil 8, that is wound to oppose the coil 7, the variations of current in 8, serving, in the well known manner, to vary the resultant excitation of the exciter 2. This resistance is of some material, whose electrical resistance changes considerably, preferably, with a given rise of temperature. It may be iron, carbon, copper, or any other conductor. In the case of carbon whose resistance becomes less as it becomes hotter, a different arrangement would be necessary from that employed when iron or copper was used. In Fig. 1, we may consider 11, as a rheostat built of iron wire or thin strips, preferably the latter, because they will present a larger surface area for cooling and will, therefore, lose their heat rapidly on a decrease of the heating current. In the circuit from the armature terminal 5, of the separate exciter to the field coil of 1, is a rheostat 9, of any desired character which serves to adjust the potential of the machine 1, by adjusting the exciting current flowing from 2. The machine 2, is, it will be seen, self exciting (though it might be otherwise excited) and is magnetized by the difference in effects of 7 and 8. The current flowing around 7, and the fields of 1, must be sufficient to magnetize 1, to such a degree that the required potential shall be had between the lines A and B; and also to overcome the action of 8, to such amount that the exciter will be able to furnish the magnetizing current. 10, is an artificial resistance placed in the branch around 11, formed by the armature of 2, coil 8, and their connections, and constructed to have high self induction so as to oppose in a high degree the tendency to the shunting of the alternating currents from 1, around resistance 11. Its resistance as a dead wire resistance to the flow of a direct or continuous current is, however, made low so that it shall not oppose to any great extent the flow of the armature currents from 2, through the resistance 11, and coil 8. The self induction may be made adjustable by means of a movable core for the resistance coils or otherwise.

The general operation is as follows:—When the external circuit of the generator 1, is open, no current flows through 11, and its resistance, if it be of iron, is at the minimum. Hence the coil 8, acts with its full effect to cut down the field of the exciter 2. Upon closing the external circuit, the iron in 11, begins to heat by the current, and increases in resistance. This diminishes the current in 8, the latter being in series with 11, and the opposing magnetism developed by 8, is decreased, this increasing the effective field of 2. The exciter, therefore, gives a greater potential and, therefore, more current flows through 7, and the fields of 1, increasing the armature potential of 1, accordingly.

Figure 2:
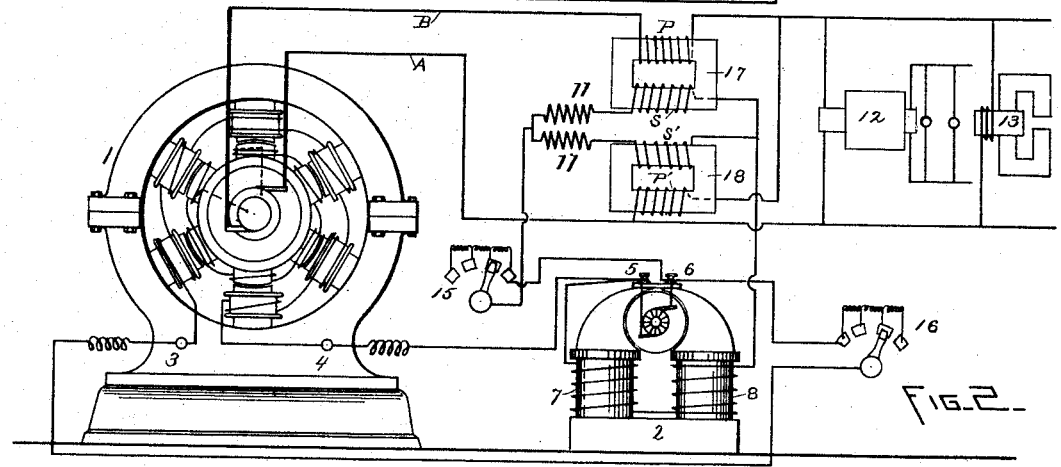
Figure 3:
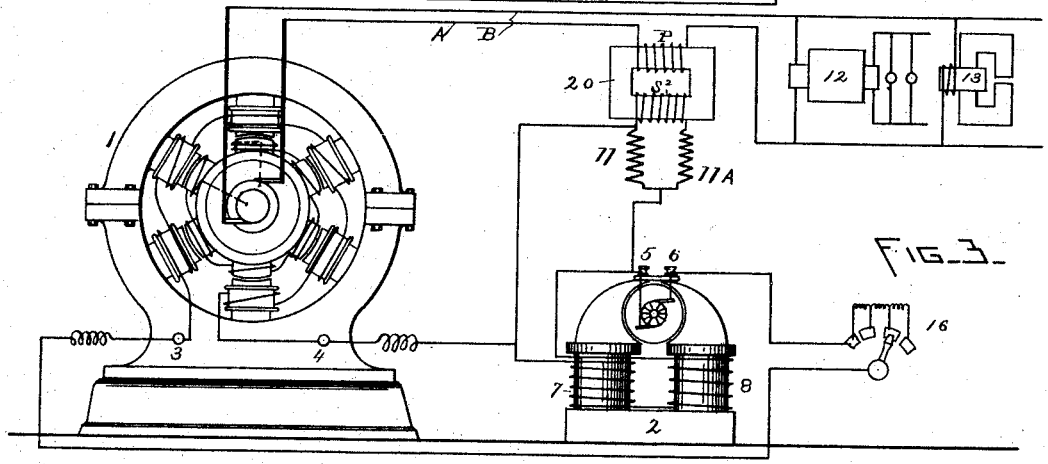

It will be noticed that in the plan shown in Fig. 1, and also in the modifications Figs. 2 and 3, the heated resistance is made to effect a change in the field of the exciting dynamo, and not directly in the field circuit of 1. This is preferable as the effect is greatly multiplied, and so great a difference in temperature is not required in the resistance to cause the desired change in 1.

Fig. 2, shows a modification in the manner of employing the resistance to vary the magnetism of the exciting dynamo fields. In this case the regulating circuit of the separate exciter is one in which the resistance 11, and exciter field coils are in series and form a shunt to the wires feeding the field of 1, whereas in Fig. 1, the regulating circuit does not contain the exciting field coils, but includes a demagnetizing or opposing coil. As will be presently shown the regulating circuit for the exciter might be a shunt simply to the series field coils thereof or may be arranged in other ways. The arrangement shown in Fig. 2, is as follows:—In series with the main "load" of the dynamo, such as a lighting transformer 12, and a welding machine 13, is the primary P, of a transformer 17. Connected from one terminal A, to the other B, is the primary P', of another transformer, 18. The primary P, is of few turns comparatively, and all the current from the armature of 1, passes through it. The primary P', is of many turns and takes the full potential of the dynamo, 1. The secondaries S and S', of these two transformers are connected together through the resistance 11, which is here shown as in two sections between which the connection leading from the exciting armature is attached, so that the current flowing through the field coils 7 and 8, of the exciter will encounter the resistance of 11. The resistance is heated indirectly in this case by the converted electric energy developed by the machine 1, and the secondary coils S, S' have circuit through said sections of resistance in series with one another and are connected so as to oppose one another on such circuit. The terminals of the secondaries opposite those connected directly to the sections of 11, are connected in multiple to the field coils 8, so that the sections 11, and coils S, S', are traversed in parallel by the current which flows in 8, while there is, at the same time, another closed circuit from S, through sections 11, to S', and back to S. The coils 7 and 8, are in this case wound to assist one another and are traversed in series by the current which flows from the armature of 2, through the variably heated resistance. In this circuit is the rheostat 15. The fields of 1, are in a direct circuit from the armature of 2, including rheostat 16. The exciter is, therefore, practically a self excited shunt wound machine.

The general operation is as follows:—When the main circuit is open, no current flows in P, and the resistance 11, is heated by the current of S', converted from the current flowing in P′. The resistance of 11, thus heated added to that of 15, determines the potential of the exciter which by means of 15, or 16, is regulated to excite 1, so as to produce an electro-motive force or potential at the terminals of 1, of the normal pressure. Now let the main circuit be closed. Current flowing through P, induces a current in S, which, as before stated, is so connected as to oppose S′, and the total heating current in 11, is decreased. The resistance of 11, is consequently lessened and the current increases in the fields 7 and 8, increasing the potential between 5 and 6. This causes more current to be generated and forced through the fields of 1, and keeps up the magnetism. The amount of resistance in rheostat 16, determines the potential existing between A and B, which may be regulated thereby. When a carbon resistance is used at 11, the secondary S, is connected to add its effects to S′. An increase of current in P, causes an increase in 11, which becomes hotter and of lower resistance, increasing the strength of the fields of 2, and consequently increasing the excitation of 1.

Fig. 3, illustrates a further modification of the invention. In the main circuit is the primary P, of a transformer 20. The circuit of the secondary S², is through resistance 11, which is heated by the current from S². The fields of 1 and 2, are in series, and connected to the terminals 5 and 6, a regulating rheostat 16, being in circuit. The resistance 11, is a shunt to the fields of 2, as the connections show. When the main circuit of the armature of 1, is open, there is no current in 11, and the resistance bears a certain relation to that of 7 and 8, so that the exciter gives sufficient potential to magnetize 1. The closing of the main circuit causes a current to be produced in S², and 11, which increases the electrical resistance of the latter so that the proportion of current shunted from the field of 2, is less, and said field becomes stronger. The potential of 2, is increased, and therefore the strength of field 1. It will be observed that in Fig. 3, as in Figs. 2 and 4, the heated resistance is divided into sections and the circuit in which the flow of current is to be influenced is connected to the division. The object of this, in the case of Fig. 3, is that the section 11ᴬ may offer a resistance to the passage of the direct or continuous current and prevent it from being shunted through S², which offers little resistance to such currents. The continuous currents are thus forced to take the path through the heated resistance. In a similar way in Fig. 2, each portion of 11, prevents the short circuiting of the continuous currents through the secondary in the branch with it.

Figure 4:
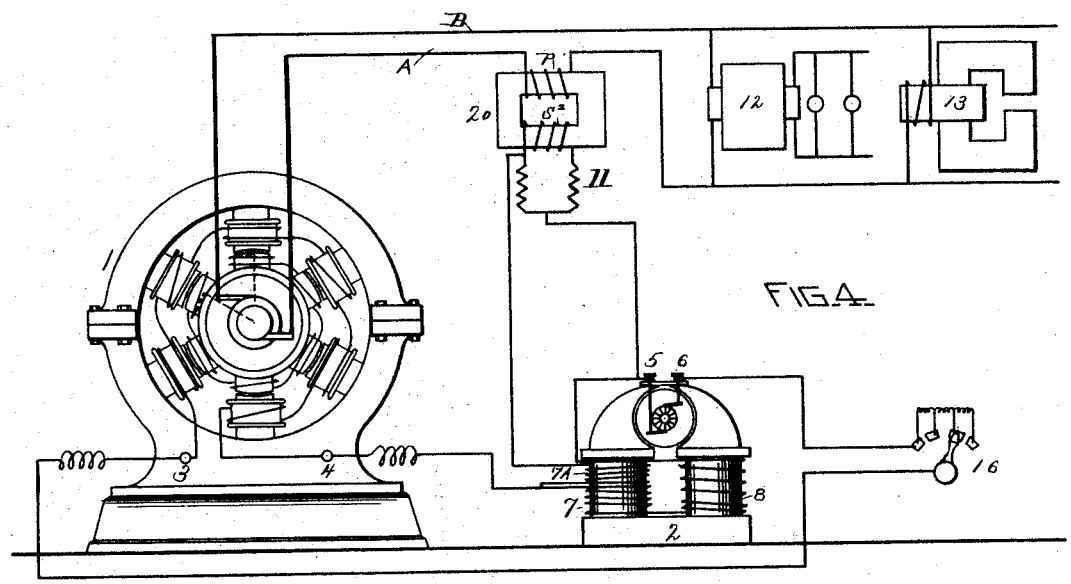
Figure 5:
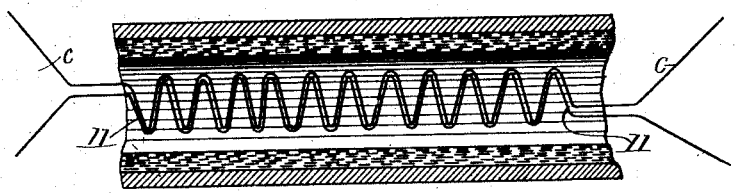

In Fig. 4, is shown a modification of the plan shown in Fig. 3. The current which is shunted from the fields of 2, is made to pass through an extra winding 7ᴬ, on the field of the exciter, in such a direction as to tend to demagnetize it. In this instance the increase of excitation of 2, on increased heating of 11, is due not only to the increase of resistance in the shunt to the field coils 7 and 8, but to the decrease of the opposing effect of coil 7ᴬ, on the field.

Fig. 5, shows a further modification in the way of heating the resistance 11, by the alternating current of the generator 1. In this case the resistance 11, is not traversed by a heating current but is heated by conduction from a neighboring circuit traversed and heated by alternating currents. C, is a conductor heated by current from 1, while the variable controlling resistance is a conductor wound in close proximity to C, so as to be heated therefrom. In this way a long resistance of comparatively small wire or strip may be used for 11, when not much current is used, while the alternating current of, perhaps, large quantity, may flow through a large wire, strip, or rod, of shorter length. To lose as little of the heat as possible the conductors are inclosed in a tube lined with a non-heat conducting substance.

Fig. 6, illustrates a modification in which the heated resistance is made to vary the flow of current in the field coils of 1, directly, instead of varying the exciting dynamo field. The dynamo 2, is designed to give constant current, and is connected directly to 3 and 4, the terminals of the field of 1. The resistance 11, is in series with the main circuit of the alternating dynamo, and is also a shunt across the fields of the machine. In circuit with the fields 7 and 8, of dynamo 2, is a resistance 21, which may be varied to cause the exciter to give the desired current. With the main circuit of 1 open, i. e., no current flowing, the resistance 11, bears a definite relation to the field of 1, so that the proportion of the current from 2, flowing around the fields of 1, is sufficient to excite the dynamo 1, to the normal potential. An increase of resistance in 11, however, such as will occur when there is current on the main circuit, will change the ratio of 11, to the fields of 1, and a larger proportion of the current from 2, will flow in the field coils of 1, increasing the magnetization.

Fig. 7, shows a differential arrangement, the heated resistance having the effect of causing one part of the system to predominate and thus effect a change in the dynamo 1. In the exciting circuit two dynamos are used, 2 and 2ᵃ; 2, having a greater capacity than 2ᵃ. They have resistances in their field circuits 24 and 25, respectively, to regulate the output of each machine. The resistance 11, which is heated by the current of the main circuit is in series with the field of the smaller machine 2ᵃ, for instance. The dynamos 2, 2ᵃ, are connected to act against each other. That is, two terminals of like polarity are connected together, in the drawings, negative to negative, and the other terminals are connected to the binding posts 3 and 4 of the machine. The machines 2, 2ᵃ, are constant potential machines, and if one, 2ᵃ, is developing less potential than the other, (2,) normally, the current in the field of 1, will depend upon the predominance of the potential of 2, over 2ª. Such is supposed to be the condition of affairs at the outset, and before the main circuit is closed, the difference in the electro-motive forces of the two machines being sufficient to excite 1, to the required degree. When the main circuit is closed the resistance 11, will heat, thereby introducing more resistance into the field of 2ª, and decreasing the potential between 5ª, and 6ª. This means less counter effect or "kick" of 2ª, against 2, the latter predominating still more than before, with a corresponding increase of current in the fields of 1. In reality, 2, is the exciter and 2ª, a variable counter-electro-motive-force. The variable controlling resistance heated by the alternating current here operates indirectly to control the flow of current from an exciting source through the field coils of 1, by controlling the amount of a resistance (counter electro-motive resistance) in the direct circuit of said source.

Fig. 8, illustrates the use of a carbon resistance in the main circuit. The terminals 5 and 6, of the exciting dynamo 2, the binding posts 3 and 4, and the carbon resistance 26, are all in series. Normally, the current in the fields of 1, from the dynamo 2, excites them the required amount, this current, of course, flowing through the carbon resistance, also. The closing of the main circuit, with the attendant increase of current in the carbon, causes the resistance of the latter to become less, it being a well known fact that the heating of carbon lessens its electrical resistance. This reduces the resistance in the exciting circuit causing the required increase of current in the fields of 1.

Figs. 9, 10 and 11, illustrate forms of resistances adapted to vary in amount with the variations of temperature produced directly or indirectly by the alternating current.

Fig. 9, shows a liquid resistance. The plates 27 and 28, are perforated with holes to allow free circulation of the liquid, and are rigidly held apart in any desirable manner, say by insulating blocks 29 and 30, for instance. The cables 31 and 32, are fastened to the plates and brought outside. The vessel 33, which contains the liquid in which the plates are immersed may be of glass, rubber, porcelain, or any suitable material. The liquid may be pure water, acidulated water, salt water, or any liquid which will conduct the current. The effect is to lessen the resistance as the liquid becomes warmer.

Fig. 10, shows a carbon resistance made of either plates or rods, alternate tops and bottoms being connected by copper pieces, and terminals being secured to the free ends.

Fig. 11, illustrates a liquid resistance, practically the same as that shown in Fig. 9, but hermetically sealed, and with pipes connecting the top and bottom with a large tank. The purpose of this construction is to afford a circulation of the liquid for quick cooling when the current is discontinued, or lessened. The circulation will not be rapid enough to prevent a desirable heating while the current is flowing, but considerably heated liquid will be between the plates. However, when the current ceases to flow, the rheostat will cool off very quickly.

The large tank is kept at an even temperature, either by using a large body of liquid in it, or exposing a large cooling surface, or by artificial means. There may be a valve in one pipe to regulate the speed of circulation and thereby the rapidity of change in resistance of the rheostat, as well as the average resistance.

What I claim as my invention is—

1. The herein described method of regulating an alternating current dynamo, consisting in heating an electric conductor placed in an alternating current circuit directly or indirectly by current delivered from said dynamo, and varying the excitation of the dynamo through the changes of resistance of said conductor due to variations of the heating effect of said current.

2. The herein described method of regulating an alternating current dynamo, consisting in heating an electric conductor in an alternating current circuit directly or indirectly by the current of said dynamo, and varying the action of a separate exciter by the changes in resistance of said conductor due to variations of heating.

3. The herein described method of regulating an alternating current dynamo, consisting in heating an electric conductor placed in an alternating current circuit directly or indirectly by the current of said dynamo, and varying the field of a separate exciting dynamo by the changes of resistance of said conductor due to changes of heating.

4. The herein described method of regulating an alternating current dynamo, consisting in varying the excitation of the field through variations in the heating of a conductor primarily due to variations of alternating currents obtained directly or indirectly from the armature of said machine and varying as the current of such machine varies.

5. The combination with an alternating current dynamo, of a separate exciting source, and a regulating circuit of the latter containing a resistance heated directly or indirectly by the current of said dynamo, as and for the purpose described.

6. The combination with an alternating current dynamo, of a separate exciting dynamo, and a regulating circuit for the field of the latter containing a resistance heated directly or indirectly by alternating currents, as and for the purpose described.

7. The combination with a dynamo electric machine, of a separate exciting source, and a regulating or controlling resistance for the latter consisting of a conductor heated directly or indirectly by an electric energy varying with the condition of the circuit fed by said dynamo.

8. The combination with the controlling resistance variable by changes of temperature and heated by an alternating current flowing through it, of a continuous current circuit connected to said resistance, and a resistance in the latter circuit adapted to oppose low resistance to continuous currents and high resistance to alternating currents so as to prevent shunting of the alternating currents from said heated resistance.

9. The combination with an alternating current dynamo, of a separate exciter dynamo, and a resistance connected with the exciting circuits of the latter, and heated by the alternating current of the main dynamo, as and for the purpose described.

10. The combination with a regulating or controlling electric resistance variable with changes in its temperature, of a heating conductor in proximity thereto traversed by alternating currents, as and for the purpose described.

11. The combination with a variable resistance traversed by alternating currents, of a continuous current circuit connected to the same, and an inductive resistance in the continuous current connections to prevent shunting of the alternating currents.

12. The method of regulating or compounding an alternating current dynamo, consisting in exciting the same from a separate dynamo and determining the excitation of the latter by variations in the heating of a resistance primarily produced by and corresponding directly with the alternating currents of the first named or main dynamo.

13. The combination of the divided heated resistance, a continuous current circuit completed through the same in multiple, and a source of alternating heating currents in one or both of the branches in which the portions of heated resistance are respectively placed, as and for the purpose described.

14. The combination with a controlling or regulating resistance varying with changes of temperature, of two transformers having their secondaries connected to oppose one another in heating said resistance, and primaries for said transformers connected respectively into the main circuit with the work and in a shunt of high resistance to the work.

15. In a liquid resistance device, immersed electrodes forming terminals of the circuit and perforated to allow circulation of the liquid.

16. In a liquid resistance device, perforated or open work electrodes immersed in the liquid, in combination with a tank and circulating pipes or passages containing liquid kept at substantially constant temperature.

17. In a liquid resistance device, the combination with a tank, and pipes or passages for circulating the liquid heated by the current, of means for regulating the rapidity of the circulation.

18. A regulating electric resistance traversed by variable alternating currents to vary its heating and opposing thereby a variable resistance to a continuous current.

Signed at Lynn, in the county of Essex and State of Massachusetts, this 13th day of January, A. D. 1891.

HERMANN LEMP.

Witnesses:
JOHN W. GIBBONEY,
WARREN B. LEWIS.